United States Patent

[11] 3,588,040

| [72] | Inventor | Irving A. Ward<br>Los Angeles, Calif. |
|---|---|---|
| [21] | Appl. No. | 745,450 |
| [22] | Filed | July 17, 1968 |
| [45] | Patented | June 28, 1971 |
| [73] | Assignee | Modern Faucet Mfg. Co.<br>Los Angeles, Calif. |

[54] SPRAY VALVE
5 Claims, 5 Drawing Figs.

[52] U.S. Cl. .................................................. 251/244,
251/321, 137/542
[51] Int. Cl. ......................................... F16k 31/60
[50] Field of Search........................................... 251/219,
234, 239, 242, 244, 281, 321, 323, 243, 245, 246;
137/504, 542, 544

[56] References Cited
UNITED STATES PATENTS

| 504,235 | 8/1893 | Nicole | 251/245X |
| 1,175,203 | 3/1916 | Truesdell | 251/245 |
| 1,806,462 | 5/1931 | Hopkins | 251/323 |
| 2,633,150 | 3/1953 | Lewis | 137/544X |
| 3,151,628 | 10/1964 | Heckert | 137/504X |

*Primary Examiner*—M. Cary Nelson
*Assistant Examiner*—David R. Matthews
*Attorney*—Lyon & Lyon

ABSTRACT: A spray valve is disclosed which is of relatively simple and inexpensive construction. Such valves are used, for example, in conjunction with the water supply at a kitchen sink. The spray valve includes a body having a valve plug mounted therein which seats with a portion of the body to control water flow through the spray valve. A trigger member is coupled with the valve plug for operation of the same, the valve plug being spring biased to normally maintain the valve closed.

PATENTED JUN 28 1971 3,588,040
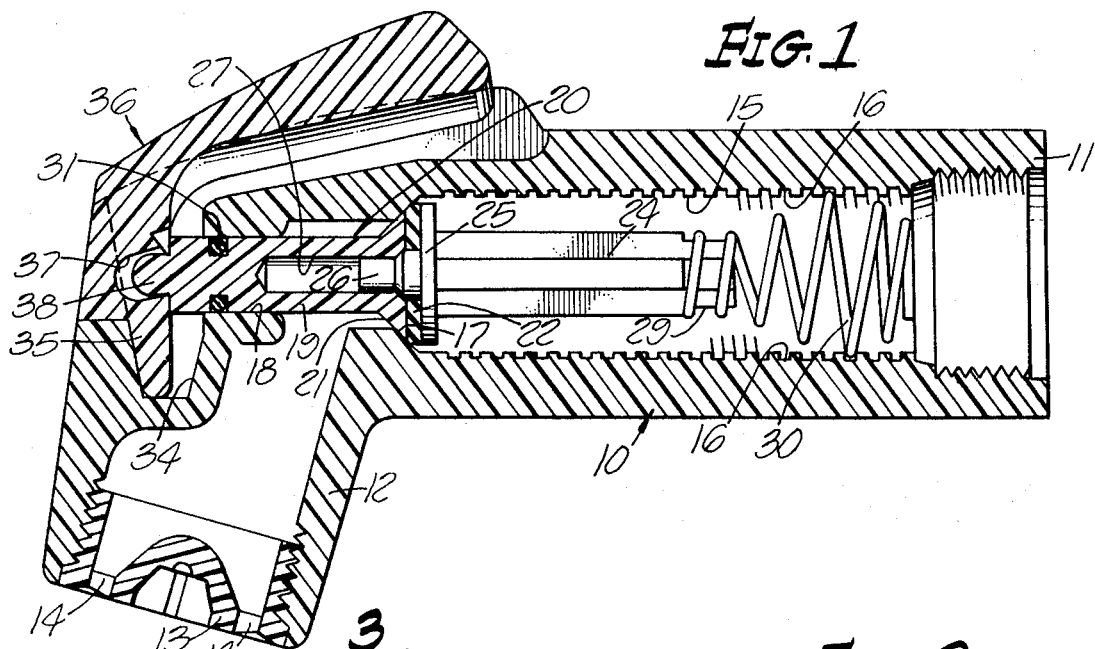
FIG. 1
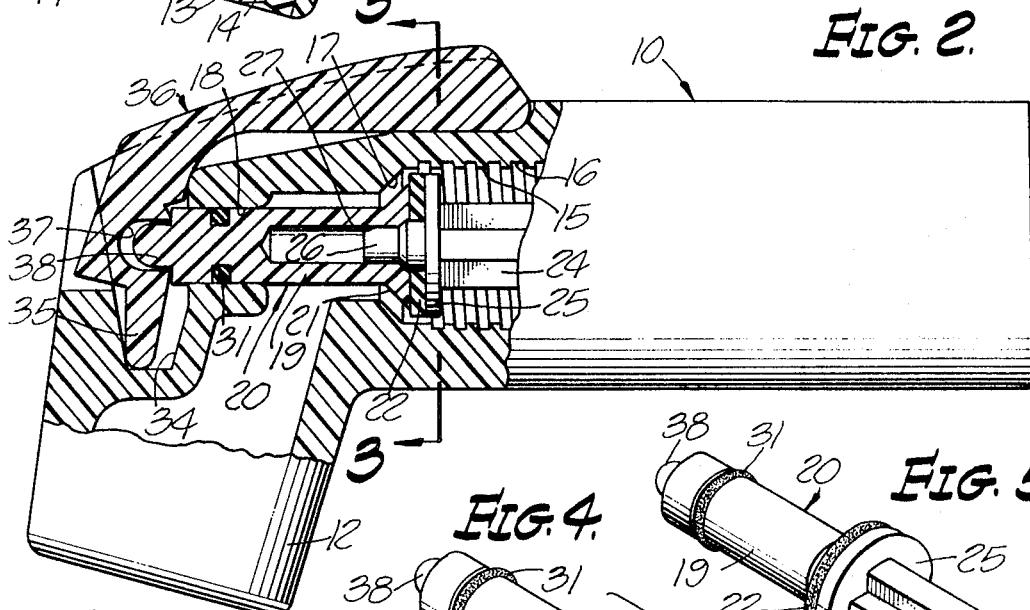
FIG. 2
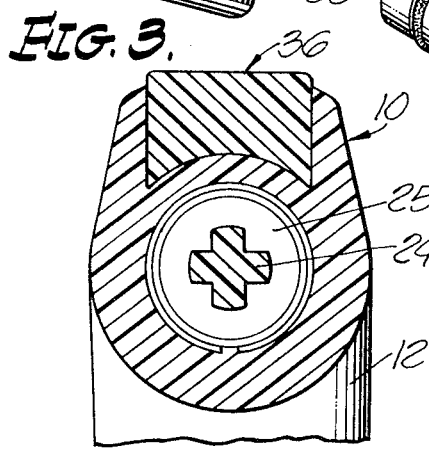
FIG. 3
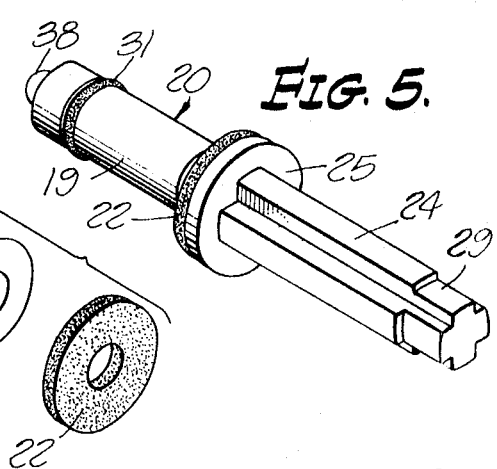
FIG. 4
FIG. 5
INVENTOR.
IRVING A. WARD
BY
Lyon & Lyon
ATTORNEYS

SPRAY VALVE

This invention relates to spray valves, and more particularly to a spray valve which is constructed of relatively inexpensive materials and which may be readily and inexpensively assembled during manufacture.

Various types of spray valves have been devised. Typically, such valves include a number of components at least some of which are relatively expensive or difficult to manufacture or the assembly thereof is relatively time consuming.

Accordingly, it is a principal object of the present invention to provide a novel spray valve of relatively simple and inexpensive construction.

Another object of this invention is to provide an improved spray valve constructed of relatively inexpensive materials and which can be readily produced in high quantity.

A further object of this invention is to provide a spray valve of a construction permitting relatively inexpensive assembly thereof.

An additional object of this invention is to provide a spray valve of relatively inexpensive and reliable construction.

These and other objects and features of the present invention will be better understood upon a consideration of the following description taken in conjunction with the drawing in which:

FIG. 1 is a cross-sectional view of a spray valve according to the present invention;

FIG. 2 is a partial cross-sectional view of the spray valve of FIG. 1 illustrating a valve plug thereof in an open position;

FIG. 3 is a cross-sectional view of the valve taken along a line 3—3 of FIG. 2; and FIGS. 4 and 5 are perspective views of a valve plug and extension used in the spray valve.

Turning now to the drawings, a spray valve constructed in accordance with the present invention includes a body member 10 which may be molded of any suitable plastic material. The body 10 includes an inlet end 11 which is threaded to receive the extremity of a hose (not shown) for directing flow from a water supply. The body 10 serves as a handle terminating in an outlet end 12 into which is screwed a suitable nozzle 13 having apertures 14 through which the water may pass. The handle portion of the body 10 includes a bore 15 having grooves 16 therein. The bore 15 terminates in a frustoconical valve seat 17.

The forward end of the body 10 includes a bore 18 into which is positioned the stem 19 of a valve plug 20. The valve plug 20 includes a tapered flange 21 terminating in a flat face against which a resilient seat washer 22 is positioned. A valve plug extension 24 includes a flange 25 and terminates in a plug 26. As is seen in FIG. 1, the plug 26 fits within a bore 27 in the valve stem 19 thereby securing together the stem 19 and extension 24 and retaining the seat washer 25 therebetween. The remaining end of the extension 24 has a portion 29 of reduced diameter to receive an end of a spring 30. The spring 30 is retained by the grooves 16 thereby securing the same within the body 10. As will be apparent, the spring 30 serves to bias the valve plug 20 toward the seat 17 for normally preventing water flow through the spray valve. An O-ring 31 is provided on the stem 19 to provide a seal at the bore 18 in the body 10. It should be noted that the O-ring 31, which serves as a stem packing, is not subjected to any water pressure when the valve is closed as is the case with many conventional spray valves.

The forward end of the body 10 includes a slot 34 for receiving and retaining a finger 35 of a trigger 36. The trigger 36 includes a cavity 37 which mates with a projection 38 from the valve stem 19. The end of the projection 38 is substantially hemispherical in shape and mates freely with the cavity 37 so as to allow the valve plug 20 to be readily and easily moved upon depression of the trigger 36 as illustrated in FIG. 2, and to be returned by the spring 30.

The valve body 10, valve plug 20 including the stem 19 and extension 24, nozzle 13 and trigger 36 may be molded of any suitable plastic. The spring 30 preferably is formed of stainless steel to withstand corrosion. It will be apparent that the spray valve of the present invention includes a minimum of parts which are relatively inexpensive to manufacture. Likewise, assembly thereof is relatively simple inasmuch as the valve plug 20 is merely inserted into the body and then retained by the spring 30. The trigger 36 is then snapped into position.

The present embodiment of this invention is to be considered in all respects as illustrative and not restrictive, the scope of the invention being indicated by the appended claims rather than by the foregoing description, and all changes which come within the meaning and range of equivalency of the claims therefore are intended to be embraced therein.

I claim:

1. A spray valve for controlling and supplying fluid comprising:

body means including a unitary body member having a bore therein defining a first chamber adapted to receive fluid and having a second chamber therein for supplying said fluid to an outlet, the interface between said chambers providing a valve seat, said body member including a second bore therein and including a cavity adjoining said second bore;

valve plug means mounted within said body means, said valve plug means comprising a stem member extending through said second bore, an intermediate portion adapted to seat with said valve seat, and an extension;

biasing means mounted within said first bore in said body member for engaging said extension of said valve plug means and for normally biasing the intermediate portion thereof into engagement with said valve seat; and trigger means coupled with said body member, said trigger means engaging said stem member of said valve plug means in a complementary mating fashion for movement of said intermediate portion of said valve plug means away from said valve seat, said trigger means comprising a unitary member having a handle portion and a projection extending therefrom, said projection directly engaging said cavity in said body member for pivoting within said cavity when said handle portion of said trigger means is depressed for causing said movement of said intermediate portion of said valve plug means away from said valve seat.

2. A spray valve as in claim 1 wherein:

said first bore in said body member includes grooves therein, and said biasing means is a spring, said grooves retaining said spring in said body member.

3. A spray valve as in claim 1 wherein:

said intermediate portion of said valve plug means includes flange members and a resilient seat washer retained therebetween, said seat washer normally providing a seal with said valve seat.

4. A spray valve for controlling and supplying fluid comprising:

body means including a unitary body member having a bore therein defining a first chamber adapted to receive fluid and having a second chamber therein for supplying said fluid to an outlet, the interface between said chambers providing a valve seat, said bore having a plurality of grooves therein, said body member including a second bore therein, and including an exterior slot and an adjoining cavity;

valve plug means mounted within said body means, said valve plug means comprising a stem member extending through said second bore, an intermediate portion retaining a resilient seat member adapted to seat with said valve seat, and an extension;

resilient means mounted within said first bore in said body member and being retained therein by said grooves, said resilient means engaging said extension of said valve plug means for normally biasing said resilient seat member into engagement with said valve seat; and trigger means coupled with said body member, said trigger means including a unitary handle portion positioned in said slot of said body member and a finger directly engaging said cavity in said body member, said trigger means being in mating engagement with said stem member of said valve plug means for retaining said finger in pivotal engagement with said cavity and for causing movement of said resilient seat member away from said valve seat.

5. A spray valve comprising:
a unitary body member having a grooved inlet chamber, an outlet chamber, a valve seat formed between said chambers, a bore through the wall of said body member and a slot means formed in the exterior of said body member;
a valve plug positioned in said body member having an end protruding through said bore and a portion matable with said valve seat;
tapered spring means held by said grooved inlet chamber and engaging and positioning said valve plug tending to push said plug toward said valve seat and to hold said plug aligned axially in said inlet chamber; and
a unitary trigger having a handle portion at one end, a finger portion at its other end and an intermediate plug mating cavity, said trigger being positioned on said body so that its finger portion extends into the slot in said body and its mating cavity allows entry of the first end of said plug so that said plug alone holds said trigger on said body and movement of said trigger moves said valve plug away from said valve seat.